Figure 1:
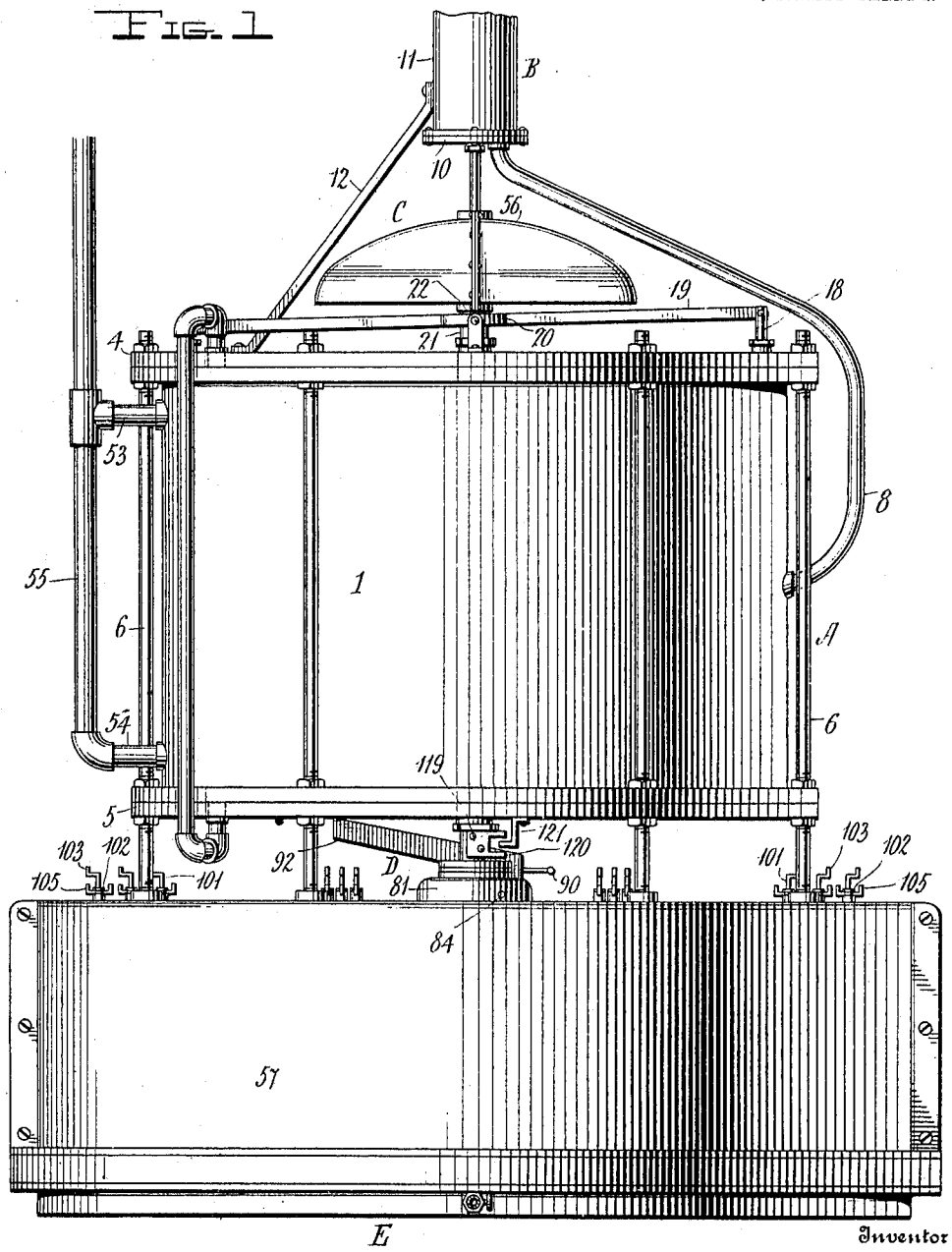

J. N. BOSCH, Jr.
GRINDING MILL.
APPLICATION FILED OCT. 27, 1908.

984,505.

Patented Feb. 14, 1911.

7 SHEETS—SHEET 1.

Witnesses

Inventor
John N. Bosch, Jr.

By

Attorneys

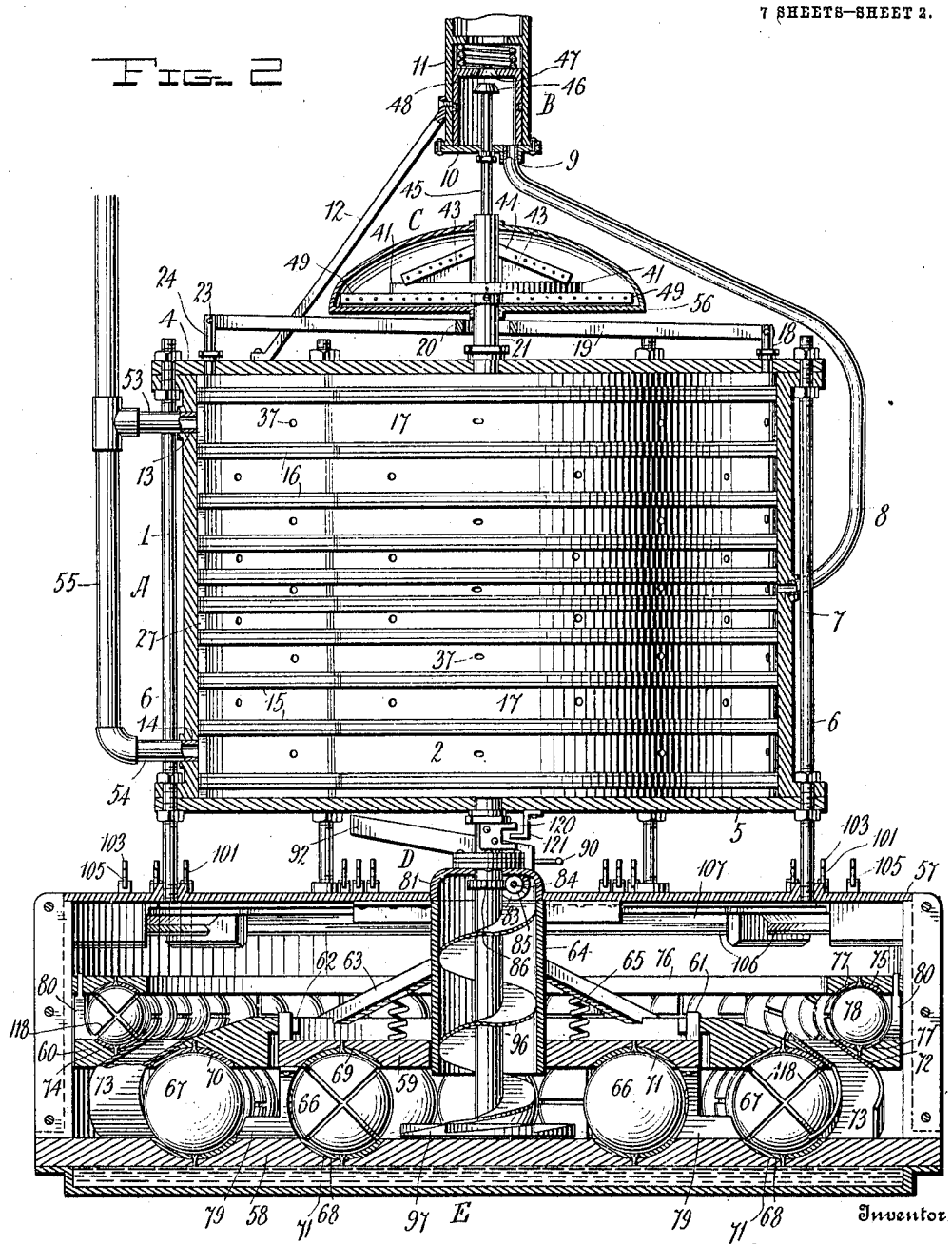

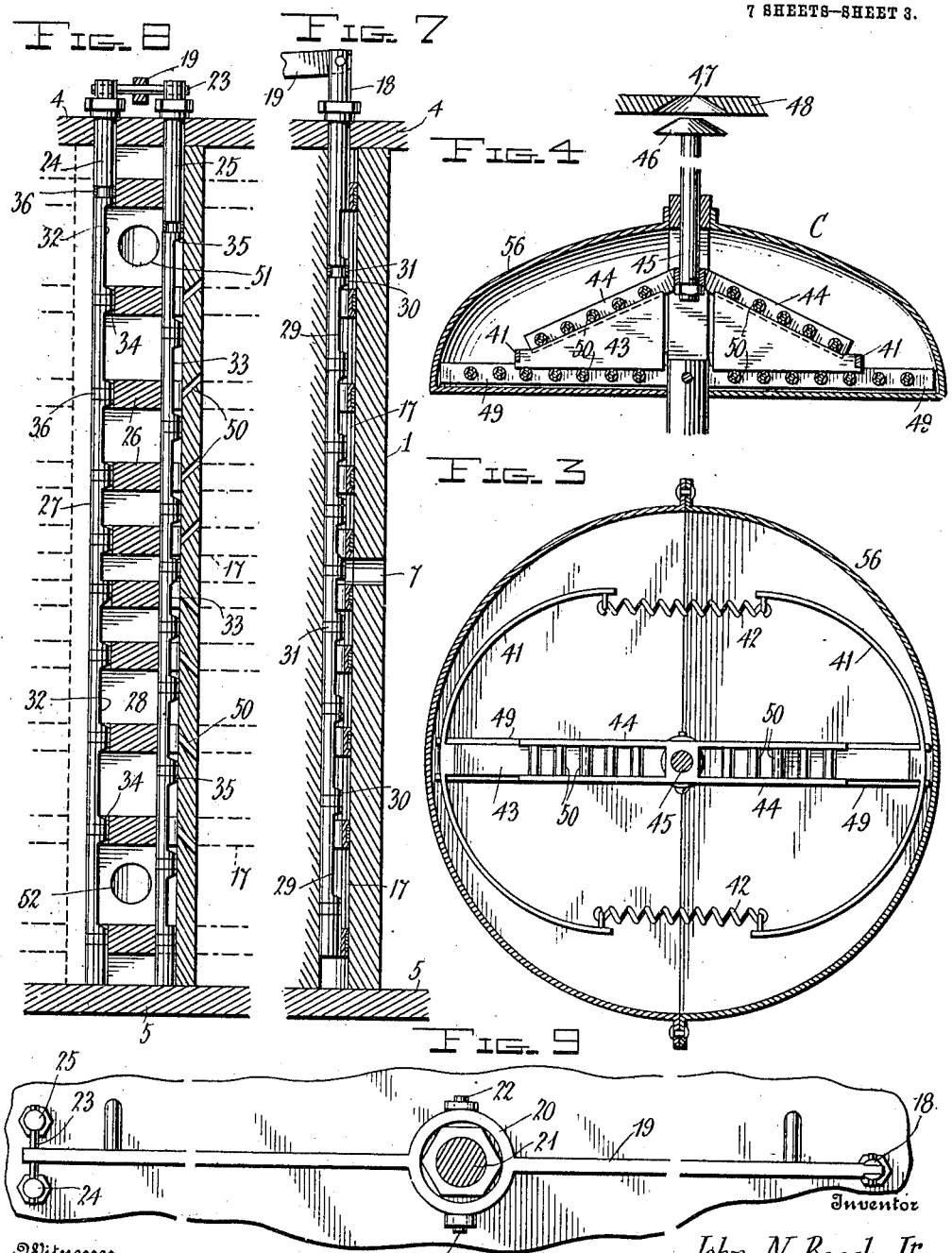
J. N. BOSCH, Jr.
GRINDING MILL.
APPLICATION FILED OCT. 27, 1908.
984,505.
Patented Feb. 14, 1911.
7 SHEETS—SHEET 3.

J. N. BOSCH, Jr.
GRINDING MILL.
APPLICATION FILED OCT. 27, 1908.
984,505.
Patented Feb. 14, 1911.
7 SHEETS—SHEET 4.
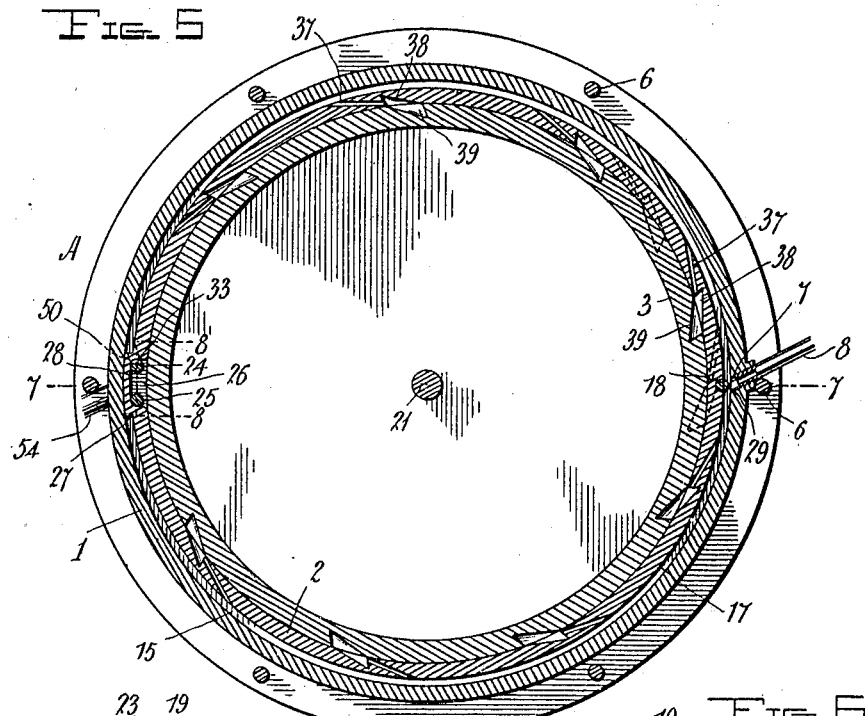
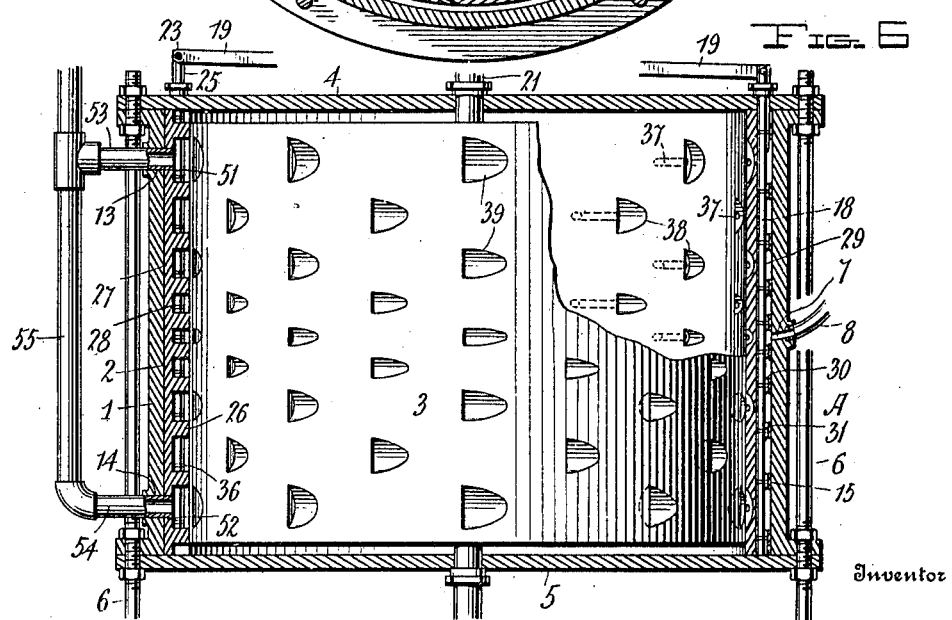
Witnesses
Inventor
John N. Bosch, Jr.
By
Attorneys J. N. BOSCH, Jr.
GRINDING MILL.
APPLICATION FILED OCT. 27, 1908.
984,505.
Patented Feb. 14, 1911.
7 SHEETS—SHEET 5.
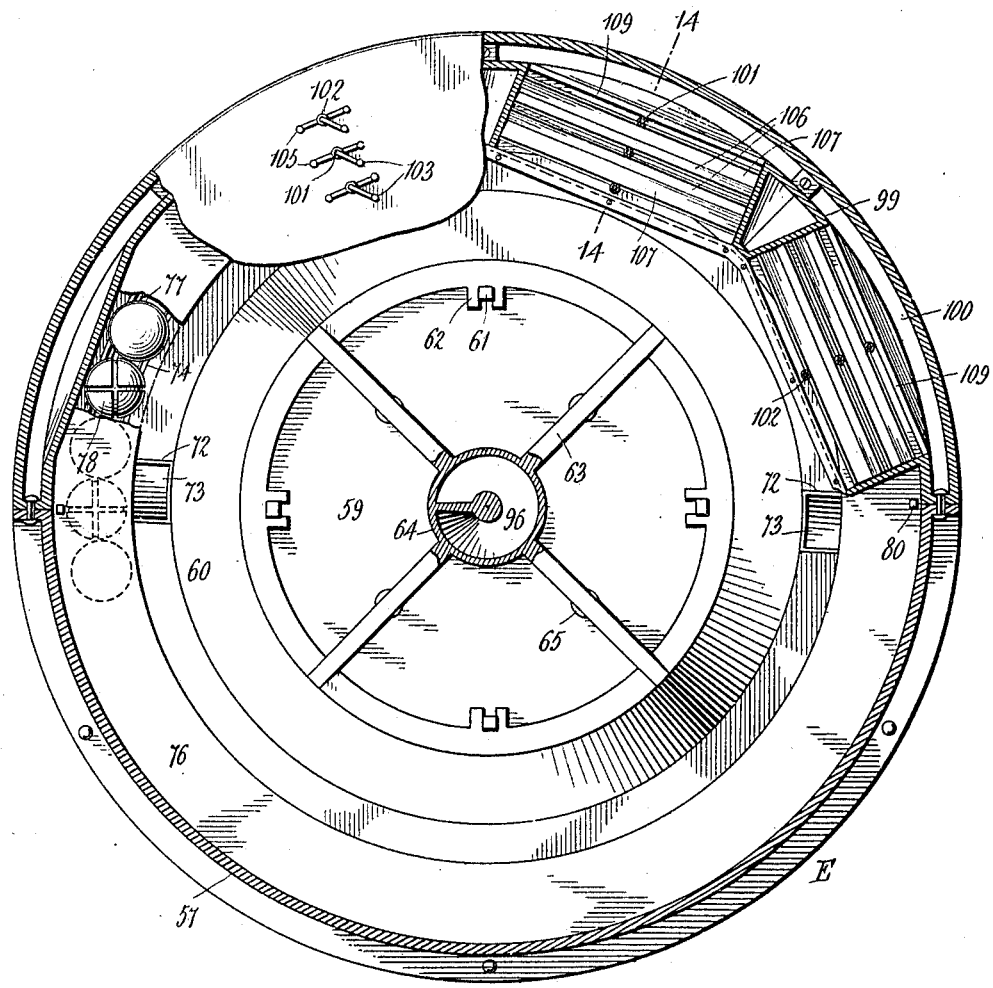
Fig. 10
Witnesses
Inventor
John N. Bosch, Jr.
By 
Attorneys J. N. BOSCH, Jr.
GRINDING MILL.
APPLICATION FILED OCT. 27, 1908.

984,505.

Patented Feb. 14, 1911.
7 SHEETS—SHEET 6.

Witnesses

Inventor
John N. Bosch, Jr.
By
Attorneys

J. N. BOSCH, Jr.
GRINDING MILL.
APPLICATION FILED OCT. 27, 1908.
984,505.
Patented Feb. 14, 1911.
7 SHEETS—SHEET 7.
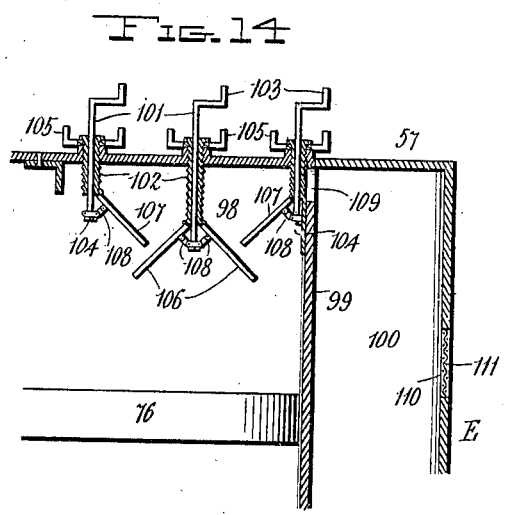
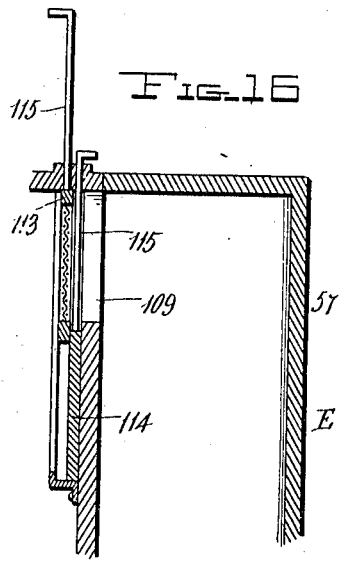
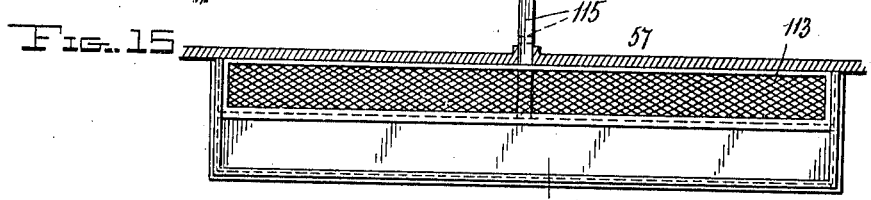
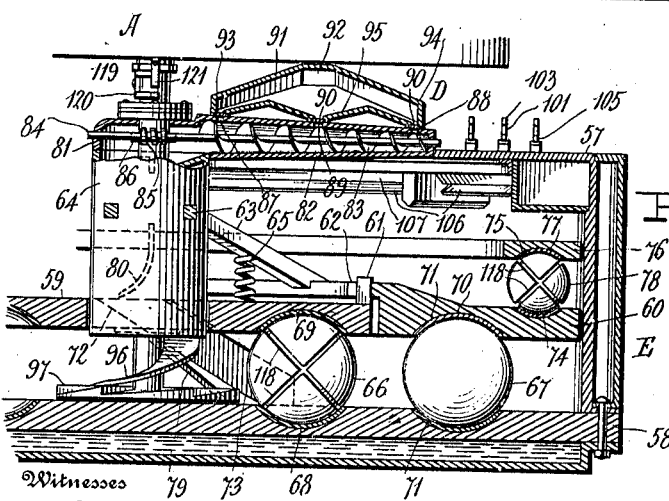
Inventor
John N. Bosch, Jr.
Witnesses
By
Attorneys
THE NORRIS PETERS CO., WASHINGTON, D. C.

UNITED STATES PATENT OFFICE.

JOHN N. BOSCH, JR., OF CEMENTON, PENNSYLVANIA.

GRINDING-MILL.

984,505.   Specification of Letters Patent.   Patented Feb. 14, 1911.

Application filed October 27, 1908. Serial No. 459,789.

*To all whom it may concern:*

Be it known that I, JOHN N. BOSCH, Jr., a citizen of the United States, residing at Cementon, in the county of Lehigh, State of Pennsylvania, have invented certain new and useful Improvements in Grinding-Mills; and I do hereby declare the following to be a full, clear, and exact description of the invention, such as will enable others skilled in the art to which it appertains to make and use the same.

The present invention relates, generally, to improvements in grinding mills, and it has for its primary object the provision of a mill of the type specified which includes novel grinding apparatus, a novel arrangement of the component parts of such apparatus with respect to each other, a novel mechanism for driving the movable member of the grinding apparatus, and novel mechanism for feeding the material to be treated to said apparatus.

To this end, the invention resides in the provision of a grinding apparatus whose upper or movable member is secured to the shaft of a steam turbine.

The invention resides more especially in the particular devices employed for feeding the material to be treated to the grinding mechanism and to the particular construction of the latter which is of the "ball" type and includes two separate series of rollers which operate in different horizontal planes, the material being fed initially to the lower series of rollers for treatment thereby, after which it is delivered to the upper series of rollers, subjected to the crushing action of the same, and finally removed in a finely divided state from the mill.

The preferred embodiment of the invention is illustrated in the accompanying drawings, in which corresponding parts or features, as the case may be, are designated by the same reference characters throughout the several views.

Figure 11:
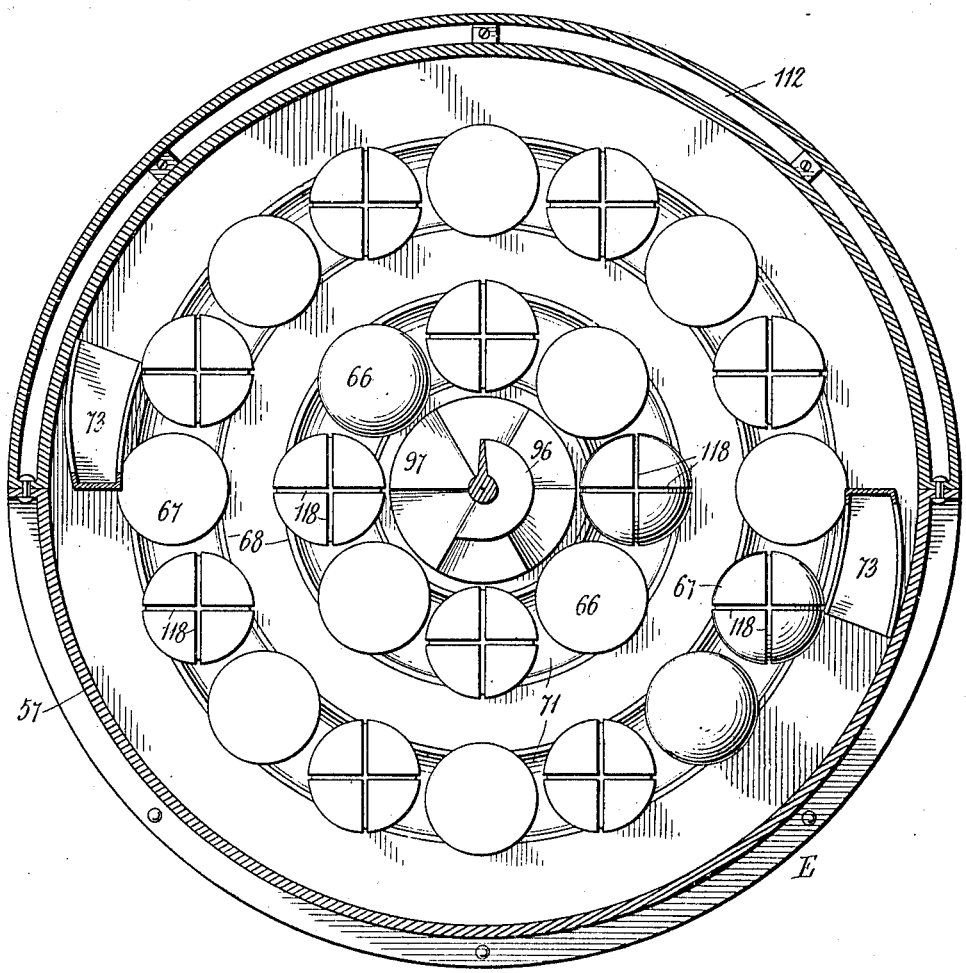
Figure 13:
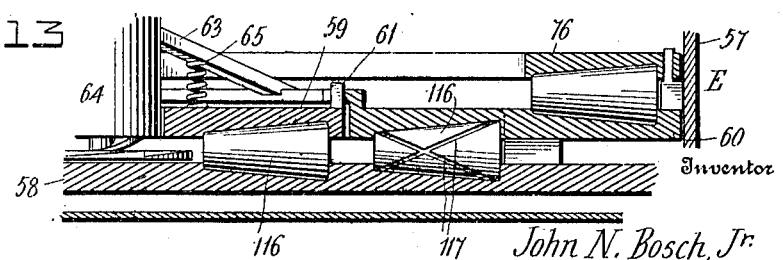

Of the said drawings, Figure 1 is a front elevation of the complete invention. Fig. 2 is a vertical section therethrough. Fig. 3 is a plan view of the governor with the casing thereof broken away, showing the governor arms in their extended position. Fig. 4 is a vertical section taken diametrically through Fig. 3, the governor arms being shown in their normal or retracted position. Fig. 5 is a horizontal section through the turbine. Fig. 6 is a front elevation, partly in section of the turbine, a portion of the central member of the turbine being broken away, to disclose the inner or rotating member. Fig. 7 is an enlarged fragmental section taken vertically through the turbine on the line 7—7 of Fig. 5, showing the single valve rod in its raised position. Fig. 8 is a similar view on the line 8—8 of Fig. 5, illustrating the double valve rod in its lowered position, the plane of said section being at right angles to that of Fig. 7. Fig. 9 is a plan view of the rocking lever for operating the valve rods. Fig. 10 is a plan view, partly in section of the grinding mechanism. Fig. 11 is a horizontal section through the lower portion of said mechanism. Fig. 12 is a vertical section taken radially through the grinding mechanism, showing the feeding devices employed in connection therewith. Fig. 13 is a fragmental vertical section showing a modified form of grinding roller. Fig. 14 is a vertical section taken on the line 14—14 of Fig. 10, illustrating the shutters which regulate the passage of dust and other impurities to the dust chamber. Fig. 15 is an enlarged detail view of a modified form of shutter. Fig. 16 is an enlarged vertical section through Fig. 15.

Referring more particularly to the drawings, A designates, generally, the turbine, to which steam is supplied from the valve chamber B in communication with the main supply pipe (not shown); C the governor connected with the shaft of the turbine; and D the devices for feeding the grain or other material to the grinding mechanism, which latter is generally designated by the reference character E.

The turbine A consists of three nested concentric cylindrical shells 1, 2 and 3, and upper and lower heads 4 and 5, respectively, whose projecting peripheral edges are connected together by bolts 6. The outer and central shells 1 and 2 are stationary, and the former is provided at one side with an inlet opening 7 formed therethrough midway between its top and bottom edges, in which opening is fitted one end of an outlet pipe 8, whose other end is fitted in an opening 9 formed in the lower head 10 of the cylindrical valve chamber B, the vertical wall 11 of which is connected by a brace 12 with the turbine head 4 above mentioned.

The outer shell 1 has both its inner and its outer faces plane and unbroken except by the above mentioned inlet opening 7 and by a pair of outlet or exhaust openings 13 and 14 arranged one above the other and formed in the diametrically opposite side of the shell from the opening 7, said exhaust openings being referred to more specifically hereinafter. The central shell 2 has formed upon its outer face a series of circumscribing horizontal ribs 15 arranged parallel with and in spaced relation to each other, each rib being provided in turn with a circumscribing groove in which a packing ring 16 is disposed, the outer faces of the rings contacting with the inner face of the shell 1. The spaces between adjacent ribs thus form annular steam chambers 17, the opening 7 communicating directly with the central chamber, as shown in Figs. 6 and 7. Directly opposite said inlet opening there is located an endwise movable vertical valve rod 18 slidable through alining openings formed in the ribs 15, said rod having a length sufficient to extend some distance above the upper head 4 of the turbine, its upper end being pivotally connected to the adjacent end of a horizontal rocking lever 19, which, intermediate its ends is enlarged to form a collar 20 through which the turbine shaft 21 passes, said shaft, collar and shoulder being provided with registering perforations for the reception of a horizontal pivot bolt 22. The other end of the lever is provided with a cross pin 23 to whose ends are pivotally connected the upper ends of a pair of parallel valve rods 24 and 25, which pass through alining openings formed through the ribs 26 located upon the inner face of the shell 2 and lying in the same horizontal planes with the corresponding ribs 15, which latter terminate flush with the adjacent longitudinal edges of the vertical shoulder 27 which extends from top to bottom of said shell and is formed by thickening the shell at such point. The spaces between adjacent ribs 27 form steam chambers 28.

The rod 18 has a longitudinal series of seats 29 formed in one side thereof, as shown in Fig. 7, the ribs 30 between adjacent seats being provided with packing rings 31. The rods 24 and 25 are in like manner provided with series of seats 32 and 33, which seats and the ribs 34 and 35 therebetween are disposed out of alinement with each other, as shown in Fig. 8, the ribs of both series carrying packing rings 36. The seats in the rod 18 have a length exactly equal to the height of the corresponding chambers 29 and the ribs 30 therefore have a length equal to that of the ribs 15. In like manner, the height of the ribs 34 and 35 is equal to that of the ribs 26.

The vertical wall of each steam chamber 17 has formed therein a circumscribing series of ports 37 each of which extends inwardly through the shell 2 at an angle of about 30° and opens through the vertical face of a bucket 38, said buckets being formed in the inner face of said shell, and being similar in shape to the series of buckets 39 which are formed in the outer face of the shell 3 which is rigidly connected in any preferred manner with the turbine shaft 21, the arrangement of the buckets of the shell 2 with respect to those of the shell 3 being such that the steam which enters the annular chambers 17 will pass through the ports 37 and buckets 38 and will impinge directly against the vertical faces of the buckets 39, forcing the shell 3, in which said buckets are formed, and with it the turbine shaft to rotate, as will be understood.

The speed at which the turbine is driven is controlled both by the governor C and by the rocking lever 19, the governor serving to automatically control the flow of steam to the turbine, while the manually-operated lever governs to a large extent the course of the steam upon entering the turbine. The first-mentioned apparatus as shown in Figs. 2, 3 and 4, comprises a pair of oppositely-disposed semi-circular hoops 41 whose mutually-adjacent ends are connected together by expansible coil-springs 42. Intermediate its ends each hoop is fastened to the forward end of a wedge-shaped block 43 whose oblique upper face is in contact with the adjacent similarly-inclined arm 44 of the stem 45 of a cut-off valve, whose head 46 is movable into and out of a seat 47 formed in the horizontal partition plate 48 disposed within the interior of the valve chamber B. The base of each block rests upon a horizontal arm 49 secured at its inner end to the turbine shaft adjacent the upper end thereof, the extreme upper portion of the said shaft being slotted longitudinally at opposite sides to permit the passage of the arms 44 therethrough. The arms 44 and 49 each consist of a pair of rails connected by anti-friction rollers 50, the distance between the rails of each arm being slightly greater than the width of the blocks, whose upper and lower faces are therefore in contact with said rollers. By reason of this construction, it will be apparent that when the speed of the turbine becomes excessive, the hoops 41 will move in opposite directions away from each other, thus imparting a similar movement to the blocks 43, the movement of said blocks raising the arms 44, and with them the cut-off valve, to whose stem said arms are rigidly connected. The upward movement of the cut-off valve brings its head into the seat 47 and thus shuts off the supply of steam from the main supply pipe (not shown) to the inlet pipe 8. When the speed of the turbine has decreased sufficiently to permit the hoops and blocks to move inwardly under the tension of the springs 42, the cut-off valve will be free to move downwardly to its normal position, whereupon the steam is free to flow through the seat or opening 47 into the valve chamber B and thence to the inlet pipe. The action of the governor is thus automatic, as will be understood. In like manner, the speed of the turbine may be controlled to a certain extent by means of the lever 19. In the normal position of said lever, its left hand end is elevated and its right hand end depressed, the valve rod 18 being in consequence, lowered and the rods 24 and 25 raised, as shown in Fig. 6. When the first mentioned rod is in such position, its ribs 30 are disposed exactly within the openings in the ribs 15, the seats 29 in said rod registering with the annular chambers 17 between said ribs 15. The incoming steam is thus free to pass into the central chamber 17 only, passing through the ports 37 and buckets 38 which communicate with said chamber and filling the buckets 39, against whose vertical faces the steam strikes, thus rotating the inner shell 2 in which the last mentioned buckets are formed at a moderately low rate of speed. When the buckets 39 reach the central chamber 28, the steam will pass into the latter from said buckets, as will be apparent. As previously stated, the ribs 26 between adjacent chambers are likewise provided with two series of alining openings through which the rods 24 and 25 have an endwise movement, said rods being raised when the rod 18 is lowered. Each of the several chambers 28 communicates with the corresponding chamber 17 through an oblique port 50, and in addition to this, the uppermost and lowermost of said chambers are provided with exhaust openings 51 and 52, which register with the openings 13 and 14 in the outer shell 1, the pairs of openings receiving the upper and lower branches 53 and 54 of the outlet or exhaust pipe 55. When the rods 24 and 25 are in their normal or lowered position, the ribs 35 of the rod 25 will be disposed in the series of openings in the ribs 26 with which the oblique ports 50 communicate, closing said oblique ports, as will be understood. The other series of openings in which the rod 24 slides will, however, register with the seats 32 formed in said rod, thus affording a communication between adjacent chambers. It will therefore be apparent that when the steam has exhausted from the buckets 39 into the central chamber 28, it will exhaust from the latter in both directions through the last-mentioned series of openings, and will finally reach the uppermost and lowermost chambers from which it exhausts through the pairs of openings 51 and 13, and 52 and 14, and the branch pipes 53 and 54, to the outlet pipe 55. When, however, it is desired to suddenly increase the speed of the turbine, as for instance, when any of the ports leading to the buckets in the central chamber 17 become clogged by grit or other foreign material, the lever 19 is rocked upon its pivot, so as to elevate the rod 18 and lower the rods 24 and 25, as shown in Figs. 7 and 8. When the first mentioned rod is in such position, its ribs 30 are disposed directly opposite the chambers 17 and the in-coming steam is free to flow into all of said chambers, as will be apparent, passing through the ports 37 and buckets 38 and impinging against the vertical faces of the buckets 39, forcing the shell 3 to rotate at a comparatively high rate of speed, the steam exhausting from the buckets 39 into the chambers 28. Owing to the fact, however, that the rods 24 and 25 have been lowered by the movement of the operating lever, the ribs 34 formed upon the rod 24 will fit exactly in one series of openings in the ribs 26, while the oblique ports 50 which communicate with the other series of openings in said ribs will also communicate with the seats 33 formed in the rod 25, said seats intersecting said openings as shown in Fig. 8.

The steam which exhausts from the buckets 39 into the chamber 28 will thus flow through the oblique ports 50 into the rear halves of the chambers 17, said ports extending through the shoulder 27. The steam then passes through the ports and buckets 37 and 38 into the buckets 39 as in the first instance, the speed thus attained being sufficiently high to effect the dislodgment of the grit or other material as will be obvious, the actuation of the governor being likewise effected. It is evident, therefore, that when the valve rods are in their normal position, the governor is inoperative, since the speed at which the inner shell or piston of the turbine is rotated is too low to effect its actuation. When however, the piston is rotating at its high speed and such speed becomes excessive, the governor will be operated automatically, thus cutting off the supply of steam to the turbine. It will also be apparent that the provision of the valve rods and the rocking lever renders it possible to suddenly increase the speed of the turbine whenever such increase becomes necessary for any reason. The governor is preferably inclosed within a dust-proof casing 56, as shown in Figs. 2 and 4.

Directly beneath the lower head 5 of the turbine, there is secured to the turbine shaft a plate 119 provided with a pair of laterally-projecting ears 120 between which projects the laterally-bent lower end of a depending arm 121 secured to said head. These elements coöperate with each other in forming a gage or indicator of the relative position of the inner shell or piston 3 of the turbine and of the central shell 2 with respect to each other, it being apparent that if the turbine shaft and piston become disposed from their normal position incidental to a downward movement of the shaft from any cause, or if the outer or central shells of the turbine move downward toward the grinding mechanism, the bent end of the arm 12 will be disposed nearer to the upper ear 120 than to the lower ear, thus indicating such displacement.

The grinding mechanism E, which is operated by the rotation of the turbine shaft 21 and is inclosed by a cylindrical casing 57 which comprises a stationary lower member or floor 58 and a rotatable upper member consisting of inner and outer annuli 59 and 60, the former of which is provided with a series of peripherally-located series of upstanding pins 61 which are engaged between the members of a series of pairs of spaced ears 62 radially inward from the inner periphery of the annular member 60, which latter is rigidly connected by a series of oblique braces 63 with a cylindrical casing 64 which forms one element of the feed mechanism D and has its lower end projecting through the central opening in the member 59, as shown in Fig. 2, there being, however, no direct connection between the casing and said member 59, which latter is forced yieldingly downward by expansible coil-springs 65 and is thus capable of a limited vertical movement with respect to said casing, said springs bearing at their upper ends against the braces and at their lower ends against said member 59. Below the floor member 58 is located a water jacket 123, as shown in Figs. 2 and 12.

Between the members 59 and 60 and the member 58, are interposed inner and outer concentric series of balls 66 and 67 whose lower portions fit in annular races 68 formed in the upper face of the last-mentioned member, the members 59 and 60 having similar races 69 and 70 formed in their under faces, each race having a lining plate 71 of raw-hide fastened therein. The member 60 is provided at diametrically opposite points with a pair of openings 72 in which are secured the upper ends of a pair of oppositely-extending arcuate scoops 73 whose widened lower ends rest upon the upper face of the member 58, the material ground by the series of balls 66 and 67 traveling up said scoops during the rotation of said member 60. The member 60 is further provided with a race 74 which is formed in its upper face adjacent the outer peripheral edges thereof and is disposed directly below a similar race 75 formed in the under face of an annular member 76 disposed in spaced relation to and parallel with the member 60, said races being each provided with a lining plate 77 similar to the plates 71. Between the members 76 and 60 is interposed a series of balls 78, whose upper and lower portions are received in the races last-mentioned, said balls having a diameter approximately half that of the balls 66 and 67. The member 76 rests upon the balls 78 and is supported thereby.

The surfaces of the several balls 66 and 67 contact with double-ended scrapers 79 interposed therebetween, and having their upwardly-extending stems secured to the under face of the members 59, as shown in Fig. 2, while the surfaces of the balls 78 contact in like manner, with scrapers 80 carried by the member 76.

The upper end 81 of the cylindrical casing 64 above referred to is formed separate from the body portion thereof, as shown in Figs. 2 and 12, and is provided with an integral laterally-extending sleeve 82 in which is disposed a screw-conveyer 83 whose shaft 84 carries at its inner end a worm 85 which meshes with and is driven by a worm gear 86 secured to the turbine shaft 21, the diameter of said sleeve and of said conveyer gradually increasing from their outer to their inner ends.

The upper portion of the sleeve 82 is provided with a series of three inlet ports 87, 88 and 89, located respectively at the inner and outer ends and the center thereof, each of said ports being opened and closed by a manually-operated gate 90. Disposed directly above the sleeve is a hopper 91 which is filled from a chute 92 and is provided with three branch arms 93, 94 and 95 which communicate respectively with the ports 87, 88 and 89, as illustrated in Fig. 12, by reason of which fact, it will be apparent that the material fed into the hopper from said chute may be discharged therefrom through any one of the ports above mentioned by opening the gate which corresponds to said port and closing the other two gates, thus regulating to a certain extent, the speed at which the material delivered to said conveyer is fed into the interior of the casing, owing to the taper of the conveyer and of the sleeve in which the latter is disposed.

Within the body portion of the casing 64 is disposed a feed screw 96 which is rigidly attached to the turbine shaft 21 and to said body portion, below whose lower end it projects, the lowermost blade or wing of the screw which is located proximal to the floor member 58, having formed integral therewith a notched disk 97.

The operation of the grinding mechanism up to this point, may be briefly described as follows: The material fed to the chute 92, (in the present instance, crushed stone), passes therefrom to the hopper 91, whence it is delivered through one or another of the branch arms and the corresponding port to the screw 83 by which it is conveyed into the interior of the casing 64. From said casing the material is discharged by the screw 96, whose rotation throws the material against the inner series of balls 66 by which it is ground, the surfaces of the balls being cleaned by the scrapers 79 which contact therewith. The ground material gradually works its way outwardly to the series of balls 67, by which it is given a further grinding. After having been subjected to the last mentioned grinding, the material is gathered up by the scoops 73, during the rotation of the members 59 and 60, it being apparent that the latter member, which is rigidly connected with the casing 64 through the braces 63, will effect the rotation of the member 59 by reason of the engagement of its pins 62 with the ears 61. The material gathered by the scoops will travel upwardly therealong, as said members 59 and 60 rotate, and will be thrown against the upper series of balls 78 by which it will be given a final grinding, being reduced to the fineness of dust.

The rear half of the grinding mechanism is provided with a series of shutters 98 arranged in sets of three, as shown in Figs. 10, 12 and 14, each set of shutters being inclosed on three sides by a casing 99, the rear member of which is formed by the side wall of the cylindrical casing 57 whose rear half is double, the members thereof being arranged in spaced relation to each other, to provide a semi-circular outlet chamber 100. Each shutter includes a vertical stem 101 which is movable endwise through the bore of a vertical sleeve 102 and terminates at its upper end in a crank handle 103 by means of which it is raised and lowered. The lower end of each stem carries a collar 104. Each sleeve 102 is fitted in a threaded bushing formed upon the top wall of the casing 57 and is provided with a pair of handles 105 for effecting the rotation and resultant endwise movement thereof. The central sleeve of each set has pivotally connected thereto a pair of oppositely-disposed diverging wings or shutters proper 106, while the end sleeves are each provided with a single wing 107 similar to the first mentioned wings, each of the several wings being pivotally connected with the corresponding collar 104 by a link 108. Owing to the fact, therefore, that the wings 107 extend toward the adjacent wings 106, it will be apparent that the spaces between the lower edges of the wings 106 and the upper faces of the adjacent wings 107 may be increased or decreased at will by rotating the stems 101.

The rear wall of each casing 99 is provided with an outlet opening 109 which opening forms a means of communication between the interior of the casing 57 and the chamber 100 the rear wall of the latter being provided with an opening 110 through which the air escapes, or with a series of such openings if preferred. A strip of fine wire gauze 111 extends across each opening. The bottom wall of the chamber 100 has formed therein a single large outlet opening 112 (or a series of openings) which communicate with the mouth of a discharge chute (which delivers the pulverized material to the bin, the chute and bin not being shown) it being understood that the out-going air-current will carry the pulverized material out between the shutters, through the outlet openings 109 and 112, whence the material passes through the chute to the bin, the air making its exit through the opening or openings 110.

In the modified form of shutter shown in Figs. 15 and 16, the wings are replaced by a pair of independently movable sashes 113 and 114, the former of which comprises an open rectangular frame to which a gauze strip is secured, while the latter is formed by a single solid strip of any preferred material. Each sash or shutter is provided with an operating handle 115.

While the grinding members in the preferred form of the invention have been shown and described as spherical bodies, it is to be understood that they may be replaced by cylindrical or frusto-conical rollers 116 as shown in Fig. 13, the alternate rollers of each series having diagonally-arranged intersecting grooves 117 formed therein. The alternate spherical grinding members of each series are likewise provided with intersecting circumscribing grooves 118 said grooves serving to enable the crushing members to more effectively engage and ride over the material to be ground and at the same time presenting a cutting edge to said material.

By reason of the direct connection between the turbine and the piston, and of the equi-distant arrangement of the ports and buckets with which the piston and the inner shell or cylinder of the turbine, are provided, it will be apparent that the piston is simultaneously lubricated at all points by the incoming steam and will at the same time have its entire outer wall virtually out of contact with the inner wall of the cylinder, thus resulting in the provision of an elastic cushion which surrounds the piston and reduces to a minimum the friction between the latter and the cylinder.

In a cement grinding mill the tendency of the grinding members to lateral displacement is very great, and if not prevented, such displacement causes the shaft supporting the grinding members to bear with great pressure on first one side and another of its bearing with resulting excessive wear so that the life of the shaft and bearing cover a very short period. It is not feasible to lubricate the bearings of the shaft for the reason that the grit from the material passes into the lubricant and defeats the efficiency of same. It will be noted, however, that in the grinding mill herein described the shaft is attached to the rotor of a self-centering motor which maintains the shaft in a vertical position, and keeps it free from its bearings.

While the grinding mechanism is designed primarily for pulverizing broken stone, it is to be understood that any other suitable material may be fed to such mechanism for treatment by the same.

What is claimed is:

1. A grinding mill having a vertical shaft, a casing provided with bearings for said shaft, grinding elements rotated by said shaft and supported independently thereof to move in a path concentric therewith, and a self-centering motor having its rotor attached to the said shaft and serving while revolving said shaft to keep the same vertical and free from its bearings and to cause said grinding elements to operate uniformly in said concentric path.

2. In a grinding mill, the combination, with a vertical drive shaft, of upper and lower horizontal members arranged in spaced relation to each other, the upper member comprising inner and outer annular sections operatively connected; braces rigidly connecting the outer section with said shaft; an annular series of grinding rollers interposed between the lower member and said inner section for supporting the latter; spring actuated means for increasing the pressure of the inner member on the rollers; a separate series of grinding rollers interposed between said lower member and said outer section; and means for feeding the material to be ground into the space between said members and into contact with the first mentioned series of rollers.

3. In a grinding mill, the combination, with a vertical drive shaft, of upper and lower horizontal members arranged in spaced relation to each other, the upper member having a rigid connection with the drive shaft; separate inner and outer annular series of grinding rollers interposed between said members; means for feeding material into the space between said members to the inner series of rollers, and then to the outer series of rollers, for successive treatment thereby; an annular horizontal member disposed above and in spaced relation to said upper member; an annular series of grinding rollers interposed between said upper member and said annular member; and means for feeding the material ground by said outer series of rollers to the last mentioned series of rollers.

4. In a grinding mill, the combination, with a vertical drive shaft, of upper and lower horizontal members arranged in spaced relation to each other, the upper member comprising inner and outer annular sections connected together, one of said sections having a rigid connection with the drive shaft; an annular series of grinding rollers interposed between the lower member and the inner section of the upper member; a separate annular series of grinding rollers interposed between said lower member and said outer section; means for feeding material into the space between said member to the inner series of rollers, and then to the outer series of rollers for treatment thereby successively; an annular horizontal member disposed above and in spaced relation to the outer section; of said upper member, a series of grinding rollers interposed between the outer section of said upper member and said annular member; and means for feeding the material ground by said outer series of rollers into contact with the last mentioned series of rollers.

5. In a grinding mill, the combination with a vertical drive shaft, of upper and lower horizontal members arranged in spaced relation to each other, the upper member having a rigid connection with the drive shaft; separate inner and outer annular series of grinding rollers interposed between said members; means for feeding material into the space between said members to the inner series of rollers, and then to the outer series of rollers, for successive treatment thereby, an annular horizontal member disposed above and in spaced relation to said upper member; an annular series of grinding rollers interposed between said upper member and said annular member; and a pair of scoops carried by said upper member for feeding the material ground by said outer series of rollers to the last mentioned series of rollers.

6. In a grinding mill, the combination, with a vertical drive shaft, of upper and lower horizontal members arranged in spaced relation to each other, the upper member comprising inner and outer annular sections connected together, one of said sections having a rigid connection with the drive shaft; an annular series of grinding rollers interposed between the lower member and the inner section of the upper member; a separate annular series of grinding rollers interposed between said lower member and said outer section; means for feeding material into the space between said members to the inner series of rollers, and then to the outer series of rollers for treatment thereby successively; an annular horizontal member disposed above and in spaced relation to said upper section; a series of grinding rollers interposed between said upper section and said annular member are a pair of scoops carried by the outer section of said upper member for feeding the material ground by said outer series of rollers into contact with the last mentioned series of rollers.

7. In a grinding mill, the combination, with a vertical drive shaft, of upper and lower horizontal members arranged in spaced relation to each other, the upper member having a pair of vertical openings formed therethrough adjacent its outer edge at diametrically opposite points, said upper member having a rigid connection with said shaft; separate inner and outer annular series of grinding rollers interposed between said members; means for feeding material into the space between said members to the inner series of rollers, and then to the outer series of rollers, for successive treatment thereby; an annular horizontal member disposed above and in spaced relation to said upper member; an annular series of grinding rollers interposed between said upper member and said annular member; and a pair of scoops having their upper ends fitted in the openings in said upper member and their lower ends contacting with the upper face of said lower member, for feeding the material ground by said outer series of rollers to the last mentioned series of rollers.

8. In a grinding mill, the combination with a vertical drive shaft, of upper and lower horizontal members arranged in spaced relation to each other, the upper member comprising inner and outer annular sections connected together, the outer section having a rigid connection with the drive shaft, and being provided at diametrically opposite points adjacent its outer periphery with a pair of vertical openings; an annular series of grinding rollers interposed between the lower member and the inner section of the upper member; a separate annular series of grinding rollers interposed between said lower member and the outer section of said upper member; means for feeding material into the space between said members to the inner series of rollers and then to the outer series of rollers for successive treatment thereby; an annular horizontal member disposed above and in spaced relation to said upper section; a series of grinding rollers interposed between said upper section and said annular member; and a pair of scoops having their upper ends fitted in the openings formed in said upper section and their lower ends resting upon the upper face of said lower member, for feeding the material ground by said outer series of rollers into contact with the last mentioned series of rollers.

9. In a grinding mill, the combination, with a vertical drive shaft, of upper and lower horizontal members arranged in spaced relation to each other, the upper member having a rigid connection with the drive shaft; inner and outer annular series of grinding rollers interposed between said members; an annular series of double-ended scrapers interposed between said series of grinding rollers, in contact with the surfaces thereof; and means for feeding material into the space between said members and into contact initially with the inner series of rollers.

10. In a grinding mill, the combination, with a vertical drive shaft, of upper and lower horizontal members arranged in spaced relation to each other, the upper member comprising inner and outer annular sections connected together, the outer section having a rigid connection with the drive shaft, and the inner section having a yielding movement with reference thereto and to the other section; inner and outer annular series of grinding rollers interposed between the sections of the upper member and the lower member; a series of depending scrapers carried by one of said sections for contact with the rollers of both series; and means for feeding the material to be ground into the space between said members and into contact initially with the inner series of rollers.

11. In a grinding mill, the combination, with a vertical drive shaft, of upper and lower horizontal members arranged in spaced relation to each other, the upper member being provided with an axial opening; an annular series of grinding rollers interposed between said member; a feed screw secured to said shaft and projecting through the opening in the upper member into the space between said members; a cylindrical casing inclosing the upper portion of said screw and having its lower end fitting in said opening, said casing and screw being rigidly connected together; means for connecting said casing with said upper member, for effecting the rotation of the latter; a screw conveyer for feeding material into the upper portion of said casing; a sleeve surrounding said conveyer and provided with a series of ports; a gate for opening and closing each port; and a hopper provided with a separate branch arm communicating with each port.

12. In a grinding mill, the combination, with a casing, the side wall of the casing being provided with an outlet opening; of a grinding element disposed within said casing, means for actuating said grinding element, means for feeding material into said casing; a plurality of shutters for controlling the passage of the ground material through said outlet opening, said shutters being movable independently of each other, each shutter including a vertical movable stem and a wing pivotally connected therewith.

13. In a grinding mill, the combination with a casing, the side wall of the casing being provided with an outlet opening; of a grinding element disposed within said casing, means for actuating said grinding element, means for feeding material into said casing, a plurality of shutters for controlling the passage of the ground material through said outlet opening, said shutters being movable independently of each other, each shutter including a vertical sleeve fitted in the upper wall of said casing, a stem movable endwise within the bore of said sleeve, and a wing pivotally connected with the stem and with the sleeve.

14. In a grinding mill, the combination of a lower grinding element comprising sets of circumscribing concentrically arranged crushing members; an upper grinding member; means for feeding the material to the lower grinding element and moving same outwardly for treatment by its concentrically arranged crushing members; and means for then conveying the material upwardly to the upper grinding element.

15. In a grinding mill, the combination of upper and lower grinding elements; a shaft operatively connected with said grinding elements for actuating same; a feed screw secured to said shaft; a cylindrical casing surrounding said screw and communicating interiorly with the lower grinding element, whereby material is fed to the lower grinding element for initial grinding; and means for conveying the partially ground material to the upper grinding element for final grinding.

16. In a grinding mill, the combination with a vertical drive shaft, of upper and lower horizontal members arranged in spaced relation to each other; an annular series of grinding rollers interposed between said members; means for feeding material beneath the lower face of the upper member for initial grinding; means for subsequently conveying the partially ground material to the upper face of the upper member for final grinding; and means mounted upon said upper member for effecting the final grinding.

In testimony whereof, I affix my signature, in presence of two witnesses.

JOHN N. BOSCH, Jr.

Witnesses:
WILLIAM E. STEINMETZ,
FREDERICK W. MEISNER.